(12) United States Patent
Wei et al.

(10) Patent No.: US 11,250,030 B2
(45) Date of Patent: Feb. 15, 2022

(54) SYSTEMS AND METHODS FOR CLASSIFYING CONTENT ITEMS BASED ON DYNAMIC SIGNALS

(71) Applicant: Facebook, Inc., Menlo Park, CA (US)

(72) Inventors: Xiaokai Wei, Menlo Park, CA (US); Eric Hsin-Chun Huang, Foster City, CA (US)

(73) Assignee: Facebook, Inc., Menlo Park, CA (US)

( * ) Notice: Subject to any disclaimer, the term of this patent is extended or adjusted under 35 U.S.C. 154(b) by 189 days.

(21) Appl. No.: 15/969,370

(22) Filed: May 2, 2018

(65) Prior Publication Data

US 2019/0340293 A1    Nov. 7, 2019

(51) Int. Cl.
*G06F 7/00*         (2006.01)
*G06F 16/28*        (2019.01)
*G06N 20/00*        (2019.01)

(52) U.S. Cl.
CPC .......... *G06F 16/285* (2019.01); *G06N 20/00* (2019.01)

(58) Field of Classification Search
CPC ...... G06F 16/285; G06N 20/00; G06Q 50/01; G06Q 2230/00; G06Q 20/384; G06Q 30/0631
See application file for complete search history.

(56) References Cited

U.S. PATENT DOCUMENTS

| | | | |
|---|---|---|---|
| 2014/0013200 A1* | 1/2014 | White | H04N 21/4788 715/230 |
| 2015/0186368 A1* | 7/2015 | Zhang | H04N 21/4756 707/740 |
| 2017/0076225 A1* | 3/2017 | Zhang | G06N 20/00 |
| 2017/0097978 A1* | 4/2017 | Gupta | G06F 16/285 |
| 2018/0270492 A1* | 9/2018 | Larumbe | G06K 9/6262 |
| 2019/0065742 A1* | 2/2019 | Humphries | G06F 21/121 |

\* cited by examiner

*Primary Examiner* — Azam M Cheema
(74) *Attorney, Agent, or Firm* — Sheppard Mullin Richter & Hampton LLP

(57) ABSTRACT

Systems, methods, and non-transitory computer readable media can obtain dynamic signals associated with content items. A machine learning model can be trained based on the dynamic signals associated with the content items. A classification for a content item can be determined based on the machine learning model.

20 Claims, 10 Drawing Sheets

500

Extract words from user comments associated with content items based on relevance of the words to one or more topics
502

Obtain a threshold number of the extracted words from the user comments associated with the content items for training of a machine learning model
504

SYSTEMS AND METHODS FOR CLASSIFYING CONTENT ITEMS BASED ON DYNAMIC SIGNALS

FIELD OF THE INVENTION

The present technology relates to the field of social networks. More particularly, the present technology relates to techniques for classifying content items associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access. Users may provide feedback associated with a content item, for example, through comments, reactions, etc.

SUMMARY

Various embodiments of the present technology can include systems, methods, and non-transitory computer readable media configured to obtain dynamic signals associated with content items. A machine learning model can be trained based on the dynamic signals associated with the content items. A classification for a content item can be determined based on the machine learning model.

In some embodiments, the dynamic signals associated with the content items include one or more of: user comments associated with the content items, user sentiment reactions associated with the content items, or user behavior associated with the content items.

In certain embodiments, the classification for the content item can be automatically updated based on the machine learning model in response to determining that specified criteria is satisfied.

In an embodiment, the specified criteria includes one or more of: a number of new user comments associated with a content item since a previous determination of the classification, or a number of new user sentiment reactions associated with a content item since a previous determination of the classification for the content item.

In some embodiments, words from the user comments associated with the content items can be extracted based on relevance of the words to one or more topics, and a threshold number of the extracted words from the user comments associated with the content items can be obtained for the training of the machine learning model.

In certain embodiments, a correlation between words in user comments associated with content items in a set of content items and topics associated with the content items in the set of content items can be measured, and respective word lists for the topics can be generated, wherein the extracting the words from the user comments is based on the respective word lists for the topics.

In an embodiment, words from user comments associated with the content item can be extracted based on relevance of the words to one or more topics, and a threshold number of the extracted words from the user comments associated with the content item can be obtained, wherein the determining the classification for the content item is based on the obtained threshold number of the extracted words.

In some embodiments, the extracting the words from the user comments associated with the content item is based on respective word lists for topics, the respective word lists generated based on a correlation between words in user comments associated with content items in a set of content items and topics associated with the content items in the set of content items.

In certain embodiments, features for training the machine learning model include one or more of: content item attributes, user attributes, static signals associated with the content items, or the dynamic signals associated with the content items.

In an embodiment, the static signals associated with the content items include one or more of: visual content, audio track information, or text information.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
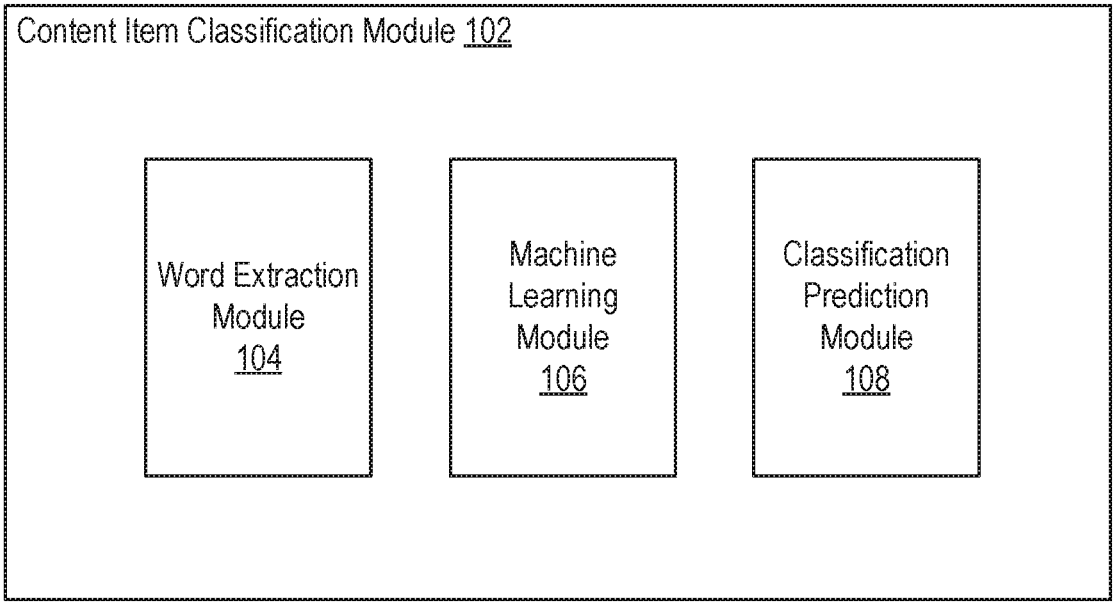
FIG. 1 illustrates an example system including an example content item classification module configured to classify content items, according to an embodiment of the present technology.
Figure 1:
Figure 1:
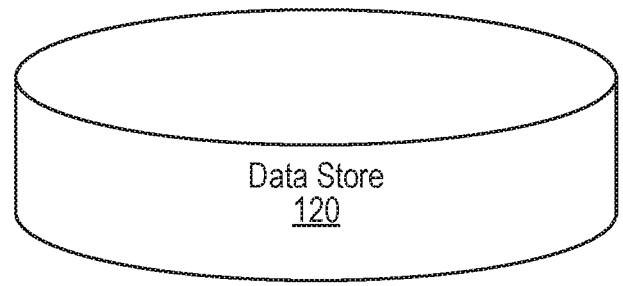

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Classifying Content Items Based on Dynamic Signals

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access. Users may provide feedback associated with a content item, for example, through comments, reactions, etc.

Conventional approaches specifically arising in the realm of computer technology can classify content items based on various attributes associated with the content items. For example, a content item, such as a video, can be classified based on static signals or attributes associated with the content item. Examples of static signals associated with a video can include visual content of the video, audio track information, text information, etc. However, conventional approaches may not take into account dynamic signals or attributes associated with a content item in classifying the content item, such as user comments or user sentiment reactions. Accordingly, under conventional approaches, a classification for a content item based on static signals may not be accurately reflective of the content item.

An improved approach rooted in computer technology can overcome the foregoing and other disadvantages associated with conventional approaches specifically arising in the realm of computer technology. Based on computer technology, the disclosed technology can determine classifications for content items based on dynamic signals or attributes associated with content items. Dynamic signals associated with a content item can include any signal that changes over time. For example, a content item can be a video included in a post within a social networking system. Users may create comments or sentiment reactions in connection with the video. User comments and sentiment reactions can be considered to be dynamic signals associated with the video since the user comments and sentiment reactions can accumulate and change over time. The disclosed technology can incorporate dynamic signals associated with content items in order to determine more accurate classifications for the content items. For example, the disclosed technology can update classification predictions for content items periodically to reflect dynamic signals associated with the content items. In some embodiments, classification of content items can be based on machine learning techniques. In this manner, the disclosed technology can determine a classification for a content item that more accurately reflects the content item. Additional details relating to the disclosed technology are provided below.

FIG. 1 illustrates an example system 100 including an example content item classification module 102 configured to classify content items, according to an embodiment of the present technology. In various embodiments, one or more of the functionalities described in connection with the content item classification module 102 can be implemented in any suitable combinations. While the disclosed technology is described in connection with content items associated with a social networking system for illustrative purposes, the disclosed technology can apply to any other type of system and/or content.

Content items can include any type of content. Examples of content items can include images, videos, audio, text, etc. Content items can include two-dimensional data, three-dimensional data, etc. Signals or attributes associated with content items can be static or dynamic. Static signals can include signals associated with content items that do not change over time. For instance, static signals associated with videos can include visual content, audio track information, text information, etc. Dynamic signals can include signals associated with content items that change over time. Examples of dynamic signals can include user comments, user sentiment reactions, etc. A user can create a comment in response to a content item. A user can also select a sentiment reaction in response to a content item. Examples of sentiment reactions can include like, happy, sad, angry, surprise, etc. In some embodiments, a content item can be included in a post, and a user can create a comment and/or select a sentiment reaction in response to the post. For instance, dynamic signals associated with videos can include user comments, user sentiment reactions, user behavior during viewing of a video, etc. Examples of user behavior during viewing of a video can include skipping through the video, adjusting volume, scrolling (e.g., up, down, left, right), etc. The disclosed technology can determine a classification for content items based on static signals and/or dynamic signals. For example, a classification for a content item can indicate a class, topic, or category associated with the content item. For illustrative purposes, content items are described as videos below, and static and dynamic signals are described in connection with videos, but the disclosed technology can apply to any type of content items.

The content item classification module 102 can include a word extraction module 104, a machine learning module 106, and a classification prediction module 108. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details.

The word extraction module 104 can extract words associated with particular topics. For example, the word extraction module 104 can extract or select words that are relevant to different topics from user comments associated with content items. The extracted words can be used in training a machine learning model to determine a classification for content items. The extracted words can also be used in determining a classification for a content item based on a trained machine learning model. For example, the word extraction module 104 can extract words based on topic relevancy and word count. Functionality of the word extraction module 104 is described in more detail herein.

The machine learning module 106 can classify content items based on a machine learning model. For example, a machine learning model can be trained based on training data including content items for which classifications have been determined. In an evaluation phase, the trained machine learning model can determine a classification for a content item. Functionality of the machine learning module 106 is described in more detail herein.

The classification prediction module 108 can predict classifications associated with content items. The classification prediction module 108 can determine a classification for a content item at different points in time in order to reflect up-to-date dynamic signals. For example, the classification prediction module 108 can automatically and periodically determine a classification for a content item to reflect contemporaneous dynamic signals. Functionality of the classification prediction module 108 is described in more detail herein.

In some embodiments, the content item classification module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content item classification module 102 can be, in part or in whole, implemented as software running on one or more computing devices or systems, such as on a server system or a client computing device. In some instances, the content item classification module 102 can be, in part or in whole, implemented within or configured to operate in conjunction or be integrated with a social networking system (or service), such as a social networking system 630 of FIG. 6. Likewise, in some instances, the content item classification module 102 can be, in part or in whole, implemented within or configured to operate in conjunction or be integrated with a client computing device, such as the user device 610 of FIG. 6. For example, the content item classification module 102 can be implemented as or within a dedicated application (e.g., app), a program, or an applet running on a user computing device or client computing system. The application incorporating or implementing instructions for performing functionality of the content item classification module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support of and operation of the content item classification module 102. The data maintained by the data store 120 can include, for example, information relating to content items, classifications, topics, word extraction, topic relevancy, word count, topic-related word lists, correlation between words and topics, machine learning models, classification predictions, settings, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the content item classification module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
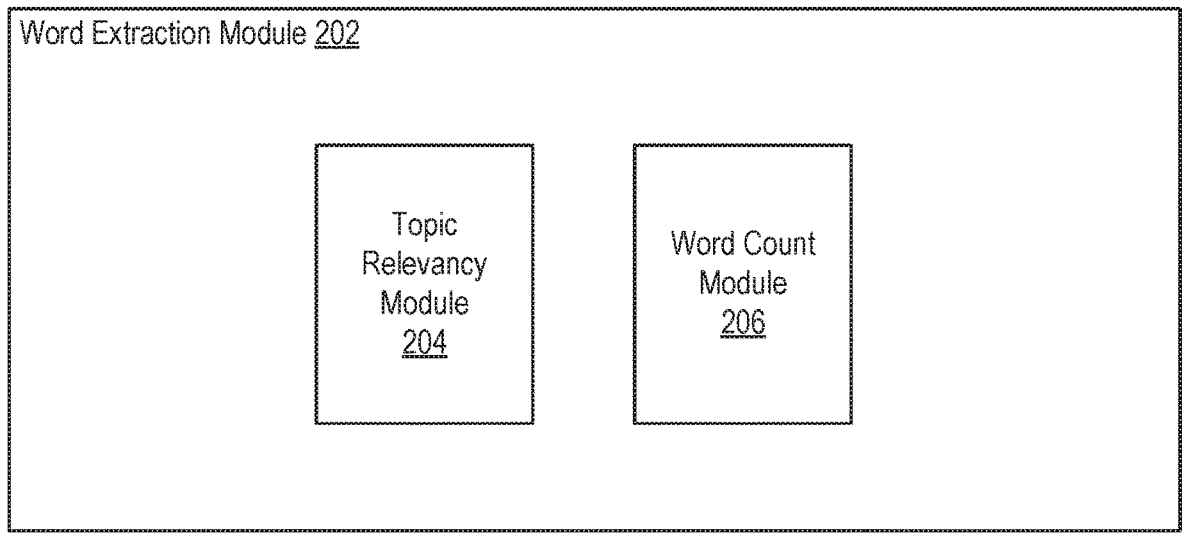
FIG. 2A illustrates an example word extraction module configured to extract words associated with particular topics, according to an embodiment of the present technology.

FIG. 2A illustrates an example word extraction module 202 configured to extract words associated with particular topics, according to an embodiment of the present technology. In some embodiments, the word extraction module 104 of FIG. 1 can be implemented with the example word extraction module 202. As shown in the example of FIG. 2A, the example word extraction module 202 can include a topic relevancy module 204 and a word count module 206.

As mentioned above, classifications can be determined for content items. Dynamic signals associated with content items, such as user comments, can include noise that may not be relevant in classifying content items. For example, user comments associated with a content item can include a significant number of words, many of which may not be relevant to classifying the content item. Accordingly, the word extraction module 202 can extract words from user comments associated with a content item that are relevant for determining a classification for the content item. For example, the word extraction module 202 can extract relevant words from user comments for content items that are to be used as training examples to train a machine learning model to classify content items. As another example, the word extraction module 202 can extract relevant words from user comments for content items that are to be provided as input to a trained machine learning model for classification. Words that are relevant to classifying content items can relate to various topics. In some embodiments, a topic can correspond to a classification. Examples of topics can include food, music, sports, etc. Many variations are possible. The word extraction module 202 can extract or select words that are relevant to different topics from user comments associated with a content item. The extracted words can be used in determining a classification for the content item. For example, the word extraction module 202 can extract words based on topic relevancy and word count, as described below.

The topic relevancy module 204 can determine relevance of words to topics and extract words from user comments that are relevant to different topics. The topic relevancy module 204 can obtain historical data or labeled data that includes content items for which classifications or topics have been determined and associated user comments. For example, historical data can include videos for which classifications or topics have been determined and associated user comments. The topic relevancy module 204 can measure correlation between words in the user comments and the topics associated with the content items in order to determine which words relate to particular topics. Various techniques can be used to measure correlation between words and topics. For example, correlation between words and topics can be measured using mutual information techniques, chi-squared techniques, term frequency-inverse document frequency (TF-IDF) techniques, etc. The topic relevancy module 204 can generate a list of words that are relevant to a particular topic. As discussed herein, a list of words that is relevant to a particular topic can be referred to as a "topic-relevant word list." The topic relevancy module 204 can extract words from user comments associated with a content item based on topic-relevant word lists for various topics. As an example, if topics include food and sports, the topic relevancy module 204 can extract words from user comments associated with a content item that are included in the topic-relevant word list for food and the topic-relevant word list for sports.

The word count module 206 can determine a word count to apply to words that are extracted from user comments associated with a content item. For example, the word count module 206 can specify a number of extracted words to use in classifying content items as a parameter. The number of extracted words to use in classifying content items can be determined as appropriate. In some embodiments, the word count module 206 can return a predetermined number of extracted words associated with a content item that occur with top frequency. As an example, if 200 words are extracted from user comments associated with a content item based on the topic-relevant word list for food and the word count is 50, 50 words out of 200 words that occur with most frequency can be used in classifying the content item. All examples herein are provided for illustrative purposes, and there can be many variations and other possibilities.

Figure 2B:
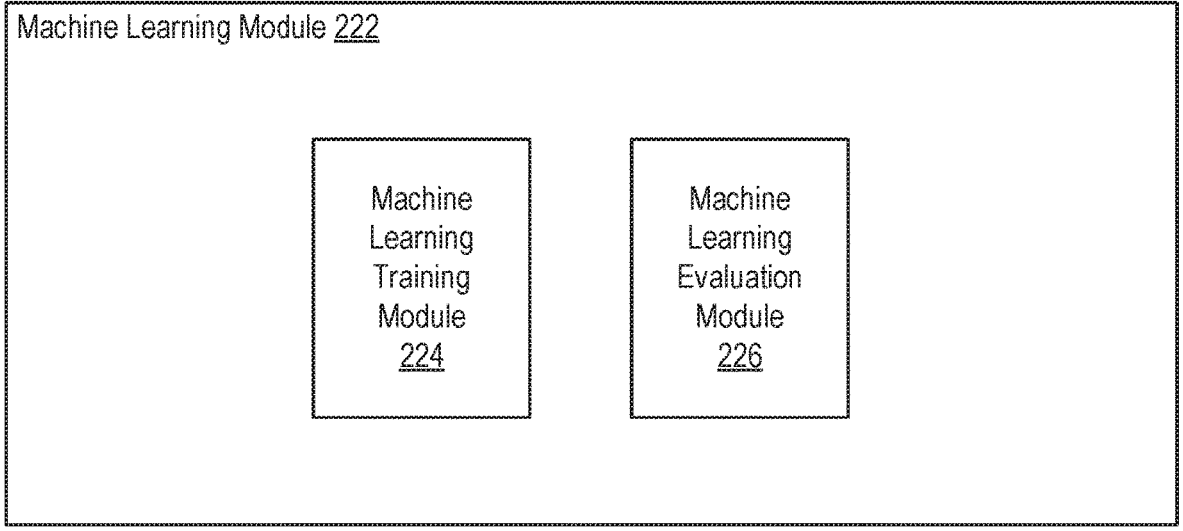
FIG. 2B illustrates an example machine learning module configured to classify content items based on a machine learning model, according to an embodiment of the present technology.

FIG. 2B illustrates an example machine learning module 222 configured to classify content items based on a machine learning model, according to an embodiment of the present technology. In some embodiments, the machine learning module 106 of FIG. 1 can be implemented with the example machine learning module 222. As shown in the example of FIG. 2B, the example machine learning module 222 can include a machine learning training module 224 and a machine learning evaluation module 226.

The machine learning training module 224 can train a machine learning model to determine classifications for content items. As mentioned above, topics can correspond to classifications. Training data (e.g., labeled data) for training the machine learning model can include information relating to content items, static signals associated with the content items, dynamic signals associated with the content items, classifications, etc. The training data can include various content items as training examples. In some embodiments, the training data can include dynamic signals, such as relevant words from user comments, for example, as extracted or selected by the word extraction module 202, as described above. For instance, if content items are videos, the training data can include information relating to videos, static signals, dynamic signals, such as extracted words from user comments, classifications, etc.

The training data can include various features. For example, features can relate to content item attributes, static signals or attributes associated with content items, dynamic signals or attributes associated with content items, etc. Content item attributes can include any attributes associated with content items. Examples of content item attributes can include a type of media (e.g., an image, a video, an audio, text, etc.), a duration of a content item (e.g., time length of a video), a subject matter, one or more objects represented in a content item, a popularity of a content item (e.g., an extent to which users interact with a content item), etc. User attributes can include any attributes associated with users. For instance, user attributes can include user attributes associated with authoring users of content items and/or viewing users of content items. An authoring user can refer to a user who creates a content item. A viewing user can refer to a user who views a content item. Examples of user attributes can include a location (e.g., a country, state, county, city, etc.), an age, an age range, a gender, a language, interests (e.g., topics in which the user has expressed interest), a computing device associated with a user, an operating system (OS) of a computing device associated with a user, etc. Static signals or attributes can indicate signals or attributes associated with content items that do not change over time or remain constant over time. Examples of static signals can include content item attributes that do not change over time, user attributes that do not change over time, etc. For instance, static signals associated with videos can include visual content, audio track information, text information, etc. Examples of text information can include text included in a video, a title, a description, and/or other information provided by an authoring user of a video. In some embodiments, static signals associated with videos can also include historical topic distribution of an authoring user of a video. Historical topic distribution of an authoring user can indicate various topics to which videos created by the authoring user relate. Dynamic signals or attributes can indicate signals or attributes associated with content items that change over time or do not remain constant over time. Examples of dynamic signals can include user comments, user sentiment reactions, any type of user reaction in response to content items, user behavior in connection with content items, identity of users who view or otherwise engage with content items, identity of users who create comments in response to content items, identity of users who select sentiment reactions in response to content items, etc. As described above, user comments can be represented by relevant words associated with various topics that are extracted from the user comments by the word extraction module 202. Examples of user sentiment reactions can include like, happy, sad, angry, surprise, etc. User behavior in connection with content items may relate to navigation behavior or pattern in connection with content items, viewing behavior or pattern (e.g., skip, pause, etc.), interaction or engagement with content items, etc. For instance, dynamic signals associated with videos can include user comments, user sentiment reactions, user behavior during viewing of a video, etc. Examples of user behavior during viewing of a video can include skipping through the video, adjusting volume, scrolling (e.g., up, down, left, right), etc. Many variations are possible. The machine learning training module 224 can retrain the machine learning model based on new or updated training data.

In some embodiments, the machine learning training module 224 can use training data relating to content items at different points in time as separate sets of training data for training the machine learning model. For example, dynamic signals associated with content items, such as user comments and user sentiment reactions, accumulate and/or change over time. Accordingly, training data relating to the same content item at different points in time can serve as different sets of training data. As an example, a content item can have 1,000 comments at time $t_1$, 2,000 comments at time $t_2$, and 3,000 comments at time $t_3$. In this example, the 1,000 comments at time $t_1$, the 2,000 comments at time $t_2$, and the 3,000 comments at time $t_3$ can each serve as separate sets of training data that each can be used to train the machine learning model at various times.

The machine learning training module 224 can train the machine learning model to generate scores for any desired number of different classifications. For each classification, the machine learning model can be trained to generate a score in response to provision of a content item to the machine learning model. The score associated with a classification can reflect a predicted likelihood that a content item falls within the classification.

The machine learning evaluation module 226 can apply the trained machine learning model to determine classifications for content items. For example, the trained machine learning model can be applied to feature data relating to a content item to determine a classification for the content item. For example, one or more classifications can be determined for the content item. As mentioned above, topics can correspond to classifications. In some embodiments, relevant words for various topics can be extracted from user comments associated with a content item prior to providing feature data relating to the content item as input to the trained machine learning model. For example, the relevant words for various topics can be extracted by the word extraction module 202, as described above. The trained machine learning model can output a score for various classifications. Each score can be indicative of a likelihood of the content item being associated with a particular classification. The machine learning evaluation module 226 can order or rank different possible classifications based on respective scores. In some embodiments, the machine learning evaluation module 226 can select as a classification for a content item the classification having a top score for the content item. In other embodiments, the machine learning evaluation module 226 can provide one or more classifications having scores that satisfy a threshold value for the content item. Many variations are possible. One or more machine learning models discussed in connection with the content item classification module 102 and its components, such as the machine learning module 222, can be implemented separately or in combination, for example, as a single machine learning model, as multiple machine learning models, as one or more staged machine learning models, as one or more combined machine learning models, etc. All examples herein are provided for illustrative purposes, and there can be many variations and other possibilities.

Figure 2C:
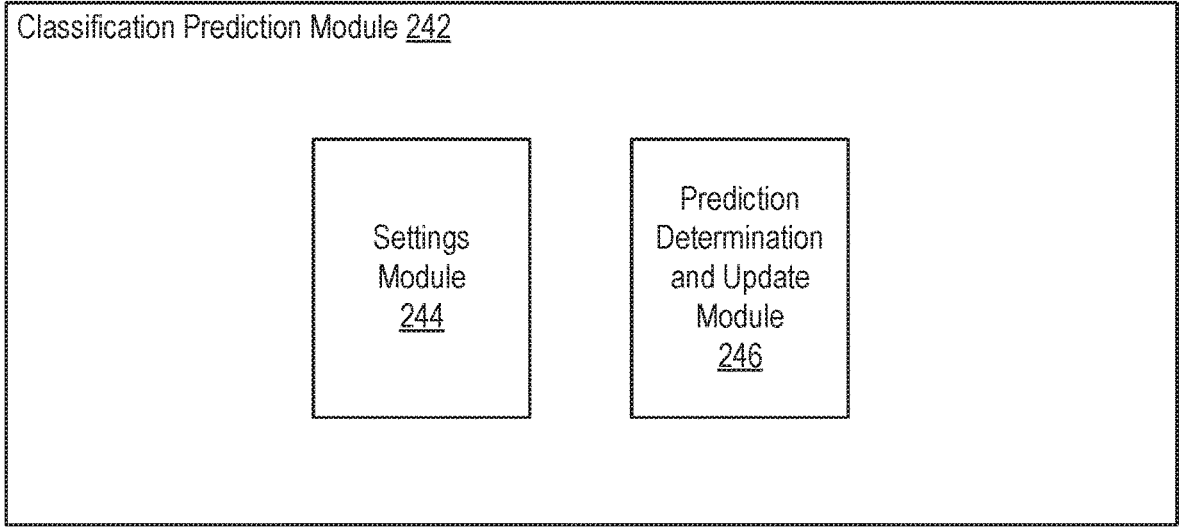
FIG. 2C illustrates an example classification prediction module configured to predict classifications associated with content items, according to an embodiment of the present technology.

FIG. 2C illustrates an example classification prediction module 242 configured to predict classifications associated with content items, according to an embodiment of the present technology. In some embodiments, the classification prediction module 108 of FIG. 1 can be implemented with the example classification prediction module 242. As shown in the example of FIG. 2C, the example classification prediction module 242 can include a settings module 244 and a prediction determination and update module 246.

Since dynamic signals associated with content items can accumulate and/or change over time, the classification prediction module 242 can determine a classification for a content item at different points in time in order to reflect up-to-date dynamic signals. For example, the classification prediction module 242 at various points in time can automatically and periodically determine a classification for a content item to reflect dynamic signals up to those points in time, as described below.

The settings module 244 can specify various parameters or criteria associated with determining and updating classifications for content items. For instance, the settings module 244 can specify a parameter for updating classifications for different types of dynamic signals. As an example, the settings module 244 can specify a parameter for user comments, and the parameter can specify that a classification for a content item should be updated for every n new comments. As another example, the settings module 244 can specify a parameter for user sentiment reactions, and the parameter can specify that a classification for a content item should be updated for every n new sentiment reactions. In some embodiments, the settings module 244 can specify a parameter for a combination of different types of dynamic signals.

The prediction determination and update module 246 can generate a classification for a content item and automatically update the classification for the content item periodically to incorporate latest dynamic signals associated with the content item. The prediction determination and update module 246 can determine one or more classifications for a content item based on a machine learning model trained by the machine learning module 222, as described above. The prediction determination and update module 246 can initially determine a classification for a content item and re-determine the classification at different points in time. The prediction determination and update module 246 can re-determine the classification for the content item based on parameters or criteria specified by the settings module 244.

In this manner, the disclosed technology can determine more accurate classifications for content items by accounting for dynamic signals associated with content items over time and periodically updating the classifications. Classifications for content items can be used in various ways. For example, a classification for a content item can be used to determine related content items that are similarly classified to provide to users in a social networking system, such as recommended content items, advertisements, etc. All examples herein are provided for illustrative purposes, and there can be many variations and other possibilities.

Figure 3A:
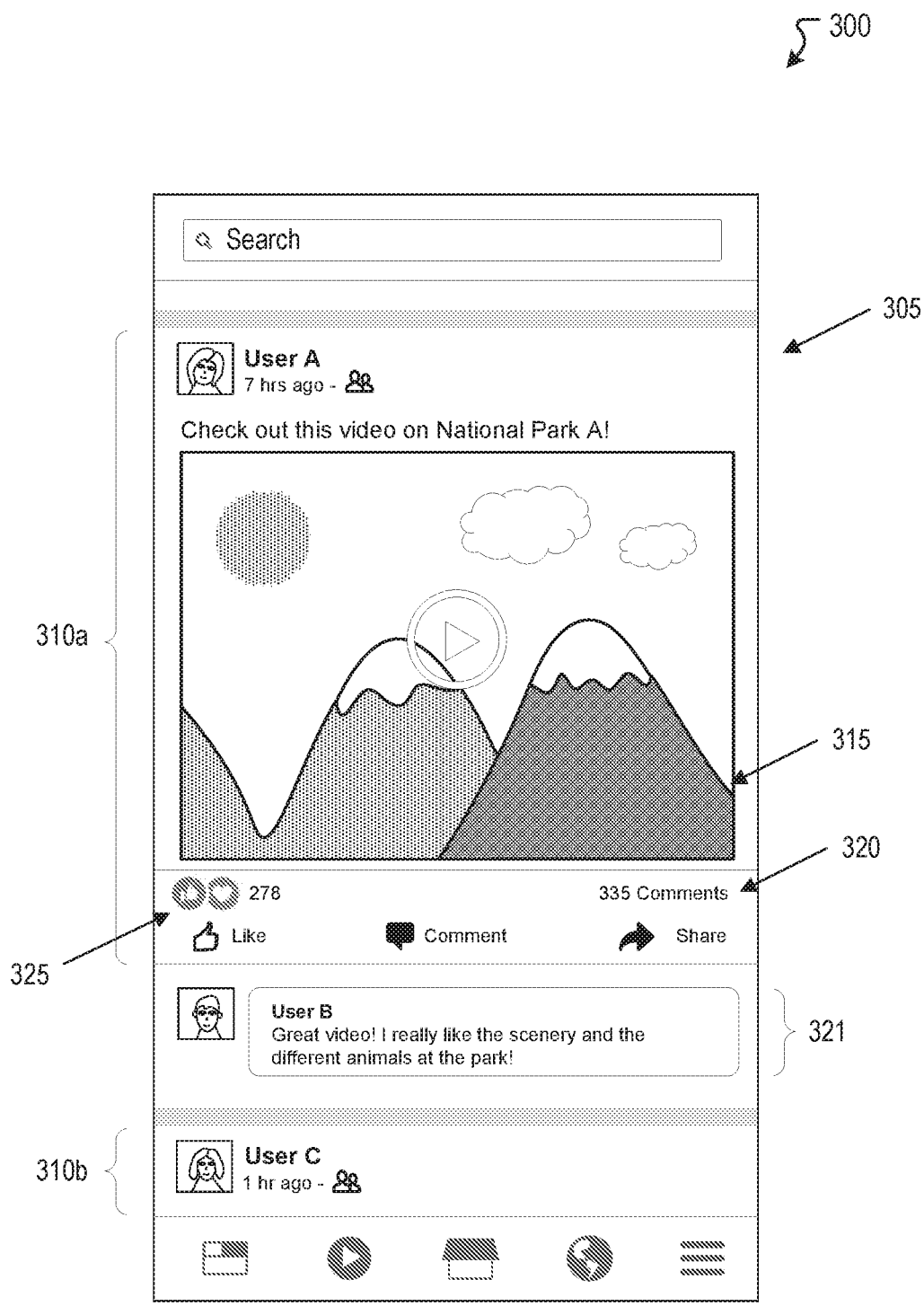
FIG. 3A illustrates an example user interface for classifying content items, according to an embodiment of the present technology.

FIG. 3A illustrates an example user interface 300 for classifying content items based on the content item classification module 102, according to an embodiment of the present technology. The user interface 300 shows a feed 305 of a user. The feed 305 includes a post 310a and a post 310b. The post 310a includes a content item 315. In the example of FIG. 3A, the content item 315 is a video. A user may create a comment in response to the post 310a or the content item 315. In the example of FIG. 3A, a total of 335 comments 320 have been created for the content item 315, including a comment 321 that is shown in the feed 305. The comment 320 includes text information, including various words (e.g., "Great video! I really like the scenery and the different animals at the park!"). A user may also select a sentiment reaction in response to the post 310a or the content item 315. In the example of FIG. 3A, a total 278 sentiment reactions 325 have been selected or created for the content item 315. The comments 320 and the sentiment reactions 325 can be considered to be dynamic signals associated with the content item 315. As described herein, dynamic signals associated with content items, among other feature data, can be used to classify the content items. In some embodiments, the content item 315 and related feature data, such as the comments 320 and the sentiment reactions 325, can be used as a training example and can be included in training data for training a machine learning model. In particular, as described above, words relevant to different topics may be extracted from the comments 320 in order to train the machine learning model. The trained machine learning model can determine classifications for content items. In other embodiments, the content item 315 and related feature data can be provided as input to a trained machine learning model in order to classify the content item 315. As described above, words relevant to different topics may be extracted from the comments 320 and provided to the trained machine learning model. The trained machine learning model can consider the extracted words from the comments 320 in classifying the content item 315. The trained machine learning model can also consider the sentiment reactions 325 in classifying the content item 315. All examples herein are provided for illustrative purposes, and there can be many variations and other possibilities.

Figure 3B:
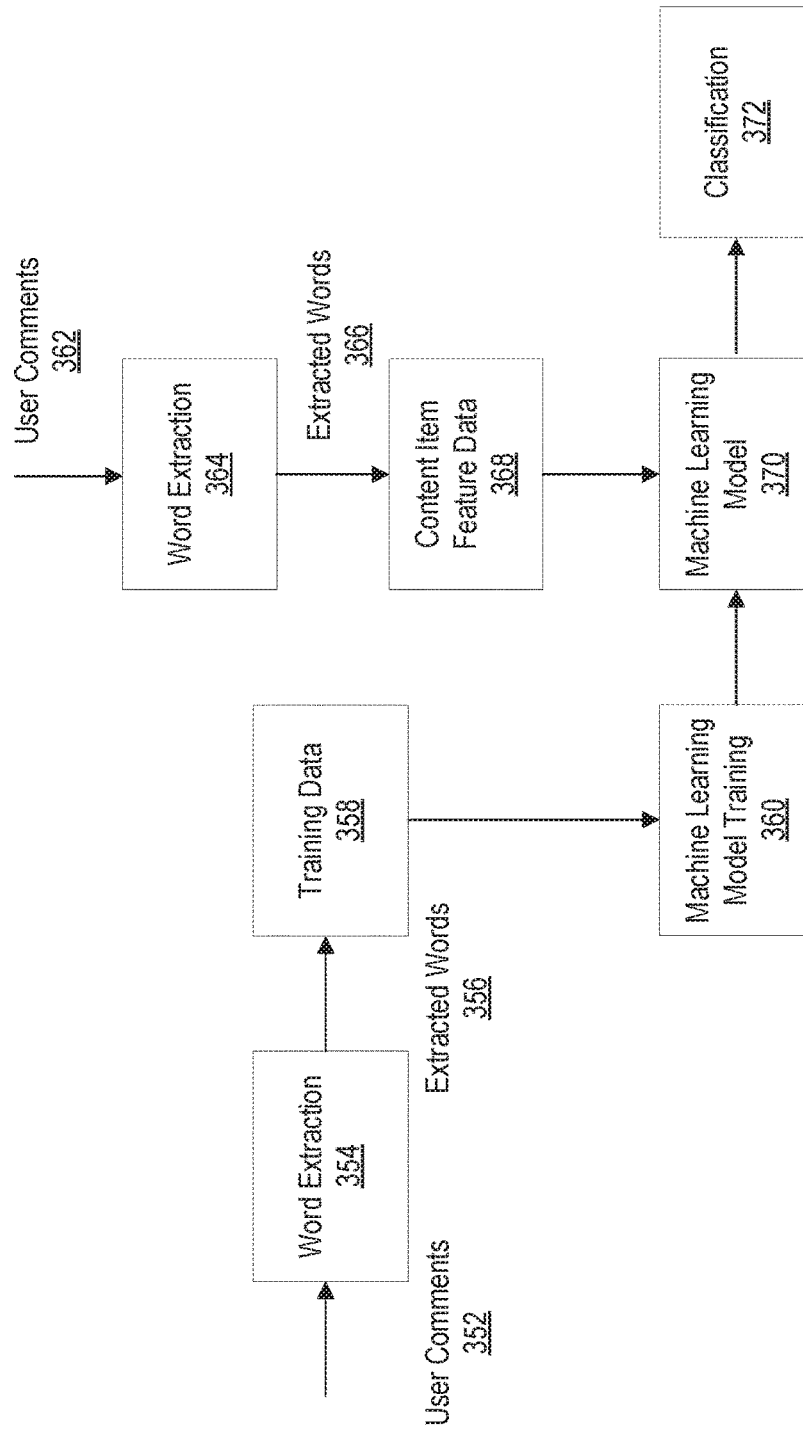
FIG. 3B illustrates an example functional block diagram for classifying content items, according to an embodiment of the present technology.

FIG. 3B illustrates an example functional block diagram 350 for classifying content items based on the content item classification module 102, according to an embodiment of the present technology. Operations and functionalities associated with the functional block diagram 350 can be performed by the content item classification module 102, as discussed herein. At block 354, word extraction can be performed on user comments 352 associated with content items. Extracted words 356 from the user comments 352 for content items can then be included in training data 358 for training a machine learning model to classify content items. For example, the training data 358 can include various features associated with content items, including the extracted words 356 for the content items. At block 360, a machine learning model 370 can be trained based on the training data 358. At block 364, word extraction can be performed on user comments 362 associated with a content item to be classified. Extracted words 366 from the user comments 362 for the content item can be included in feature data 368 for the content item to be classified by the trained machine learning model 370. The trained machine learning model 370 can determine a classification 372 for the content item. All examples herein are provided for illustrative purposes, and there can be many variations and other possibilities.

Figure 4:
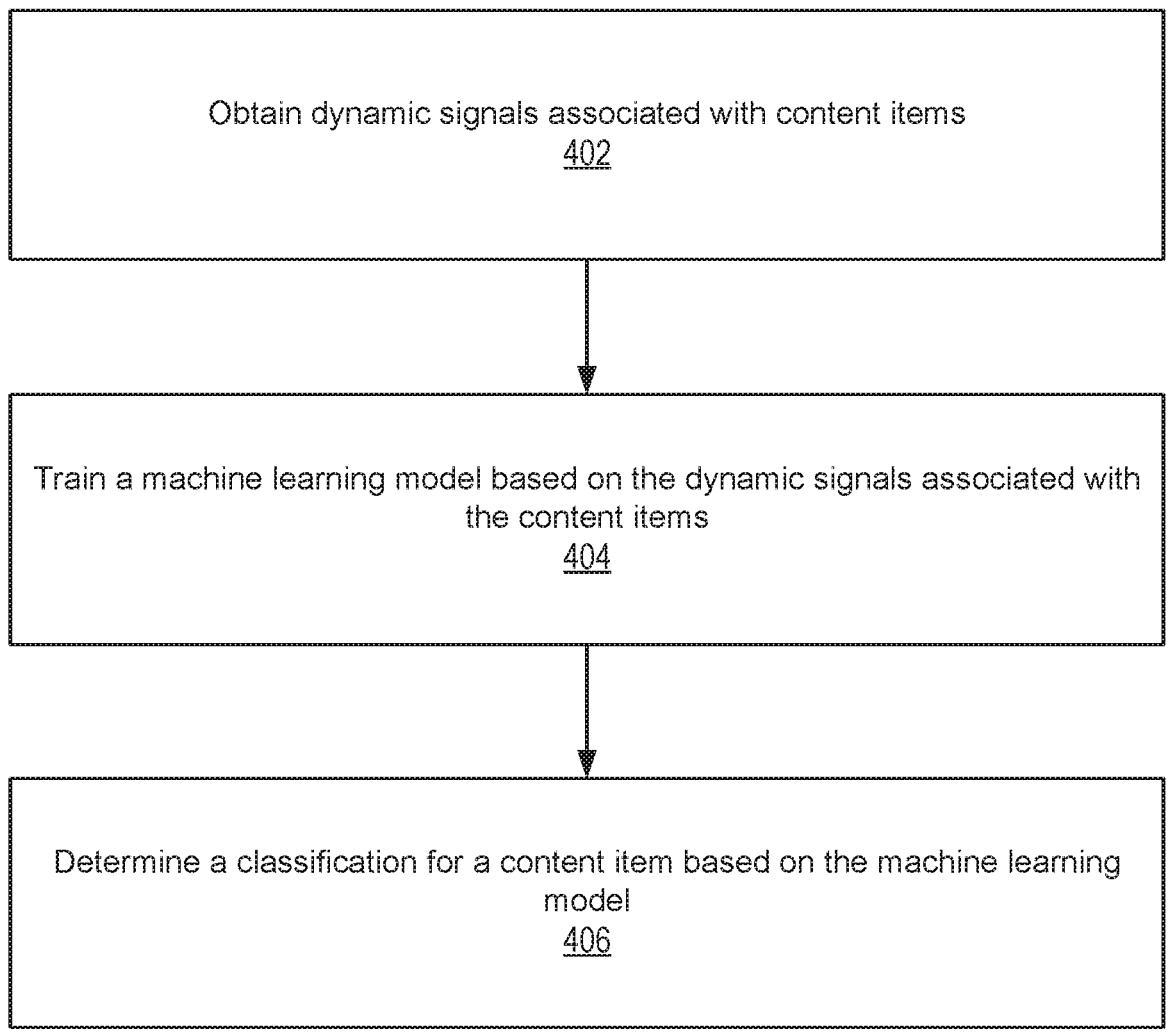
FIG. 4 illustrates an example first method for classifying content items, according to an embodiment of the present technology.

FIG. 4 illustrates an example first method 400 for classifying content items, according to an embodiment of the present technology. It should be understood that there can be additional, fewer, or alternative steps performed in similar or alternative orders, or in parallel, based on the various features and embodiments discussed herein unless otherwise stated.

At block 402, the example method 400 can obtain dynamic signals associated with content items. At block 404, the example method 400 can train a machine learning model based on the dynamic signals associated with the content items. At block 406, the example method 400 can determine a classification for a content item based on the machine learning model. Other suitable techniques that incorporate various features and embodiments of the present technology are possible.

Figure 5:
FIG. 5 illustrates an example second method for classifying content items, according to an embodiment of the present technology.

FIG. 5 illustrates an example second method 500 for classifying content items, according to an embodiment of the present technology. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can extract words from user comments associated with content items based on relevance of the words to one or more topics. At block 504, the example method 500 can obtain a threshold number of the extracted words from the user comments associated with the content items for training of a machine learning model. Other suitable techniques that incorporate various features and embodiments of the present technology are possible.

It is contemplated that there can be many other uses, applications, features, possibilities, and/or variations associated with various embodiments of the present technology. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present technology can learn, improve, and/or be refined over time.

Social Networking System—Example Implementation

Figure 6:
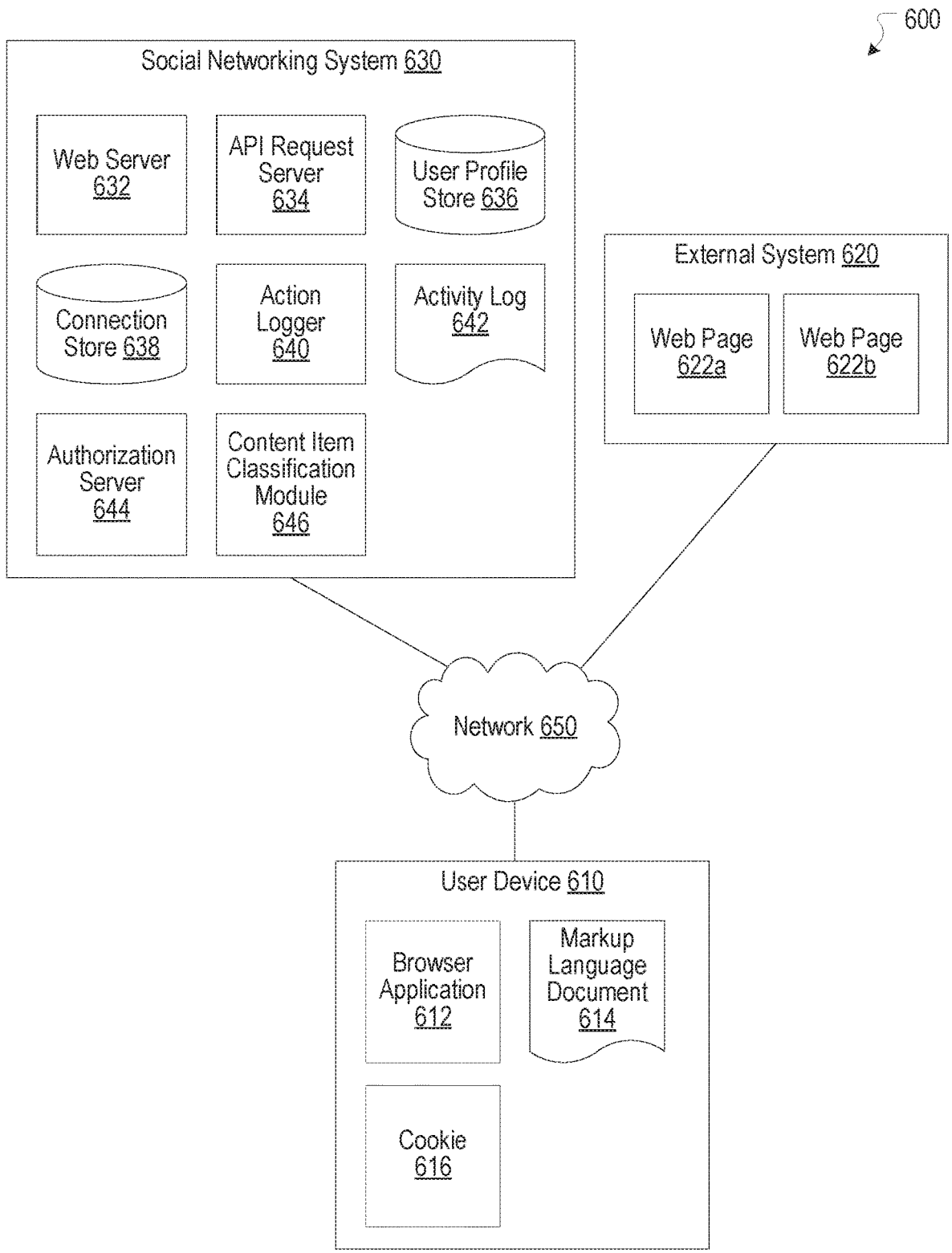
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content item classification module 646. The content item classification module 646 can be implemented with the content item classification module 102, as discussed in more detail herein. In some embodiments, one or more functionalities of the content item classification module 646 can be implemented in the user device 610.

Hardware Implementation

Figure 7:
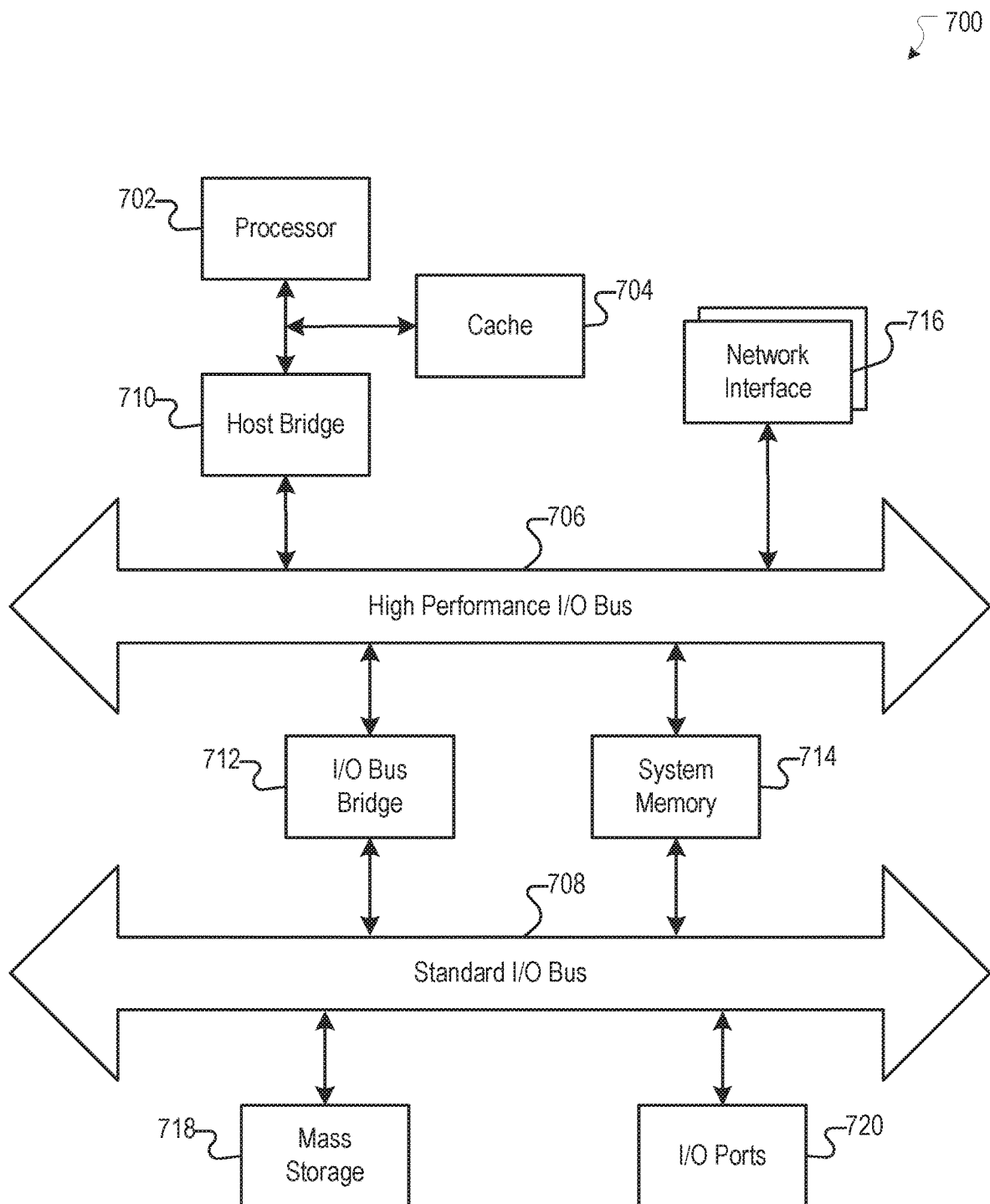
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon). Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, dynamic signals associated with content items, wherein the dynamic signals occur in response to posting of the content items;
   training, by the computing system, a machine learning model based on the dynamic signals associated with the content items;
   determining, by the computing system, a classification for a content item based on the machine learning model;
   determining, by the computing system, that at least one criterion associated with occurrence of a selected number of instances of the dynamic signals has been satisfied; and
   updating, by the computing system, the classification for the content item after a determination that the at least one criterion associated with occurrence of the selected number of instances of the dynamic signals has been satisfied, the updating based on the machine learning model.

2. The computer-implemented method of claim 1, wherein the dynamic signals associated with the content items include one or more of: user sentiment reactions associated with the content items or user behavior associated with the content items.

3. The computer-implemented method of claim 2, wherein the updating the classification is in response to a determination that the at least one criterion has been satisfied.

4. The computer-implemented method of claim 3, wherein the at least one criterion includes one or more of: a number of new user comments associated with a content item since a previous determination of the classification, or a number of new user sentiment reactions associated with a content item since a previous determination of the classification for the content item.

5. The computer-implemented method of claim 3, further comprising:
   extracting words from user comments associated with the content items based on relevance of the words to one or more topics; and
   obtaining a threshold number of the extracted words from the user comments associated with the content items for the training of the machine learning model.

6. The computer-implemented method of claim 5, further comprising:
   measuring a correlation between words in user comments associated with content items in a set of content items and topics associated with the content items in the set of content items; and
   generating respective word lists for the topics, wherein the extracting the words from the user comments is based on the respective word lists for the topics.

7. The computer-implemented method of claim 2, further comprising:
   extracting words from user comments associated with the content item based on relevance of the words to one or more topics; and
   obtaining a threshold number of the extracted words from user comments associated with the content item, wherein the determining the classification for the content item is based on the obtained threshold number of the extracted words.

8. The computer-implemented method of claim 7, wherein the extracting the words from the user comments associated with the content item is based on respective word lists for topics, the respective word lists generated based on a correlation between words in user comments associated with content items in a set of content items and topics associated with the content items in the set of content items.

9. The computer-implemented method of claim 1, wherein features for training the machine learning model include one or more of: content item attributes, user attributes, static signals associated with the content items, or the dynamic signals associated with the content items.

10. The computer-implemented method of claim 9, wherein the static signals associated with the content items include one or more of: visual content, audio track information, or text information.

11. A system comprising:
at least one hardware processor; and
a memory storing instructions that, when executed by the at least one processor, cause the system to perform:
obtaining dynamic signals associated with content items, wherein the dynamic signals occur in response to posting of the content items;
training a machine learning model based on the dynamic signals associated with the content items;
determining a classification for a content item based on the machine learning model;
determining that at least one criterion associated with occurrence of a selected number of instances of the dynamic signals has been satisfied; and
updating the classification for the content item after a determination that the at least one criterion associated with occurrence of the selected number of instances of the dynamic signals has been satisfied, the updating based on the machine learning model.

12. The system of claim 11, wherein the dynamic signals associated with the content items include one or more of: user sentiment reactions associated with the content items or user behavior associated with the content items.

13. The system of claim 12, wherein the updating the classification is in response to a determination that the at least one criterion has been satisfied.

14. The system of claim 13, wherein the instructions further cause the system to perform:
extracting words from user comments associated with the content items based on relevance of the words to one or more topics; and
obtaining a threshold number of the extracted words from the user comments associated with the content items for the training of the machine learning model.

15. The system of claim 13, wherein the instructions further cause the system to perform:
extracting words from user comments associated with the content item based on relevance of the words to one or more topics; and
obtaining a threshold number of the extracted words from the user comments associated with the content item, wherein the determining the classification for the content item is based on the obtained threshold number of the extracted words.

16. A non-transitory computer readable medium including instructions that, when executed by at least one hardware processor of a computing system, cause the computing system to perform a method comprising:
obtaining dynamic signals associated with content items, wherein the dynamic signals occur in response to posting of the content items;
training a machine learning model based on the dynamic signals associated with the content items;
determining a classification for a content item based on the machine learning model;
determining that at least one criterion associated with occurrence of a selected number of instances of the dynamic signals has been satisfied; and
updating the classification for the content item after a determination that the at least one criterion associated with occurrence of the selected number of instances of the dynamic signals has been satisfied, the updating based on the machine learning model.

17. The non-transitory computer readable medium of claim 16, wherein the dynamic signals associated with the content items include one or more of: user sentiment reactions associated with the content items or user behavior associated with the content items.

18. The non-transitory computer readable medium of claim 17, wherein the updating the classification is in response to a determination that the at least one criterion has been satisfied.

19. The non-transitory computer readable medium of claim 18, wherein the method further comprises:
extracting words from user comments associated with the content items based on relevance of the words to one or more topics; and
obtaining a threshold number of the extracted words from the user comments associated with the content items for the training of the machine learning model.

20. The non-transitory computer readable medium of claim 18, wherein the method further comprises:
extracting words from user comments associated with the content item based on relevance of the words to one or more topics; and
obtaining a threshold number of the extracted words from the user comments associated with the content item, wherein the determining the classification for the content item is based on the obtained threshold number of the extracted words.

* * * * *